US011163619B2

(12) United States Patent
Petersen et al.

(10) Patent No.: US 11,163,619 B2
(45) Date of Patent: Nov. 2, 2021

(54) TIMER-BASED MESSAGE HANDLING FOR EXECUTING STATEFUL SERVICES IN A STATELESS ENVIRONMENT

(71) Applicant: MOTOROLA SOLUTIONS, INC., Chicago, IL (US)

(72) Inventors: Georg Lund Petersen, Roskilde (DK); Pawel Antemijczuk, Soborg (DK)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 101 days.

(21) Appl. No.: 16/730,125

(22) Filed: Dec. 30, 2019

(65) Prior Publication Data

US 2021/0200609 A1  Jul. 1, 2021

(51) Int. Cl.
   *G06F 9/54* (2006.01)
   *H04L 12/58* (2006.01)

(52) U.S. Cl.
   CPC .............. *G06F 9/546* (2013.01); *G06F 9/541* (2013.01); *G06F 9/547* (2013.01); *H04L 51/14* (2013.01)

(58) Field of Classification Search
   CPC ........... G06F 9/541; G06F 9/546; G06F 9/547
   See application file for complete search history.

(56) References Cited

U.S. PATENT DOCUMENTS

| | | |
|---|---|---|
| 8,230,070 B2 | 7/2012 | Buyya et al. |
| 9,137,368 B2 | 9/2015 | Jasper et al. |
| 9,336,060 B2 | 5/2016 | Nori et al. |
| 10,191,778 B1 | 1/2019 | Yang et al. |
| 2006/0265455 A1* | 11/2006 | Yakushev ............... H04L 51/30 709/206 |
| 2017/0371724 A1* | 12/2017 | Wagner ............... G06F 9/45558 |
| 2018/0167476 A1* | 6/2018 | Hoffner ................... H04L 67/26 |
| 2018/0316639 A1* | 11/2018 | Cullen .................... H04L 67/10 |

(Continued)

FOREIGN PATENT DOCUMENTS

| | | |
|---|---|---|
| AU | 742797 B2 | 1/2002 |
| CN | 102158612 A | 8/2011 |

OTHER PUBLICATIONS

Hong Li et al., "Using Dead-Letter Queues to Handle Message Transfer Failures" (Mar. 30, 2017), pp. 1-8 [retrieved from https://docs.microsoft.com/en-us/dotnet/framework/wcf/feature-details/using-dead-letter-queues-to-handle-message-transfer-failures].*

(Continued)

*Primary Examiner* — Brian W Wathen
(74) *Attorney, Agent, or Firm* — Michael Best & Friedrich LLP

(57) ABSTRACT

A state-aware microservice system for managing messages and providing a service. The state-aware microservice system includes a plurality of instances of the service, a message broker, a memory, and an electronic processor. The processor is configured to receive, via an instance of the plurality, a message for the service and determine whether a processing of the message is consistent with a current state of the system. When the processing of the message is consistent, the processor process the message via one of the plurality of instances. When the processing of the message is not consistent, the processor transmits the message to a first queue of the message broker, determines, from a timer of the message, a time-to-live of the message, and transfers the message to a second queue of one of the plurality of instances in response to the time-to-live expiring.

9 Claims, 2 Drawing Sheets

(56) References Cited

U.S. PATENT DOCUMENTS

| | | | |
|---|---|---|---|
| 2019/0149504 A1* | 5/2019 | Norwood | H04L 12/66 709/206 |
| 2019/0197148 A1 | 5/2019 | Engstrand et al. | |
| 2020/0341876 A1* | 10/2020 | Gandhi | H04L 67/1095 |

OTHER PUBLICATIONS

Evosip (https://evosip.cloud/—https://www.youtube.com/watch?v=QOB998rAyUM) May 16, 2018.

TX2 "Technical Solution: High Volume, High Speed, Workflow" 2003-2006, TX2 Premiere Consultancy Services www.2xsquared.com (3 pages).

TX2 "Technical Solution: Timers and Timing in Message Broker" 2003-2006, TX2 Premiere Consultancy Services www.2xsquared.com (2 pages).

TX2 "Technical Solution: Event Coordination and Control" 2003-2006 TX2 Premiere Consultancy Services www.2xsquared.com (4 pages).

Boyle, A, "Using Apache Kafka for Real-Time Event Processing" Published by DZone Mar. 18, 2018 (4 pages).

Scheduling Messages with RabbitMQ, https://www.rabbitmq.com/blog/2015/04/16/scheduling-messages-with-rabbitmq/, 2015, downloaded from the Internet Dec. 17, 2019 (4 pages).

\* cited by examiner

# TIMER-BASED MESSAGE HANDLING FOR EXECUTING STATEFUL SERVICES IN A STATELESS ENVIRONMENT

BACKGROUND OF THE INVENTION

Microservices are provided in a computing architecture, in which each application is decomposed into a plurality of different, smaller services (microservices). Each of these microservices runs its own application processes and communicates with light-weight mechanisms (for example, application program interfaces (APIs)). Because microservices are implemented and deployed independently of each other (independent processes), they may be monitored and scaled independently while facilitating continuous delivery and deployment. Existing monolithic software applications, for example, emergency call/message handling applications, have been modified to be implemented as microservices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
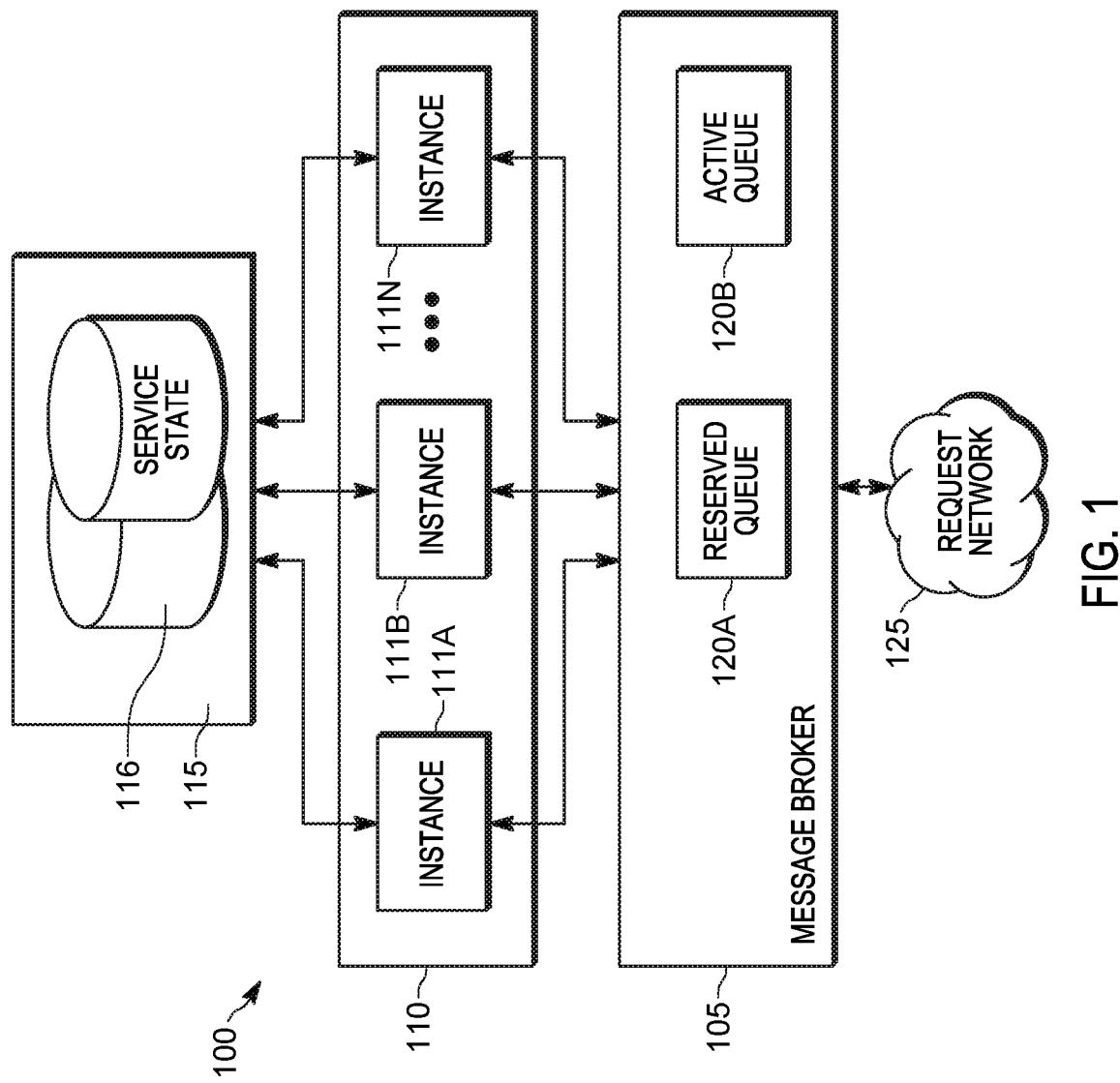
FIG. 1 is a diagram of a microservice system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Emergency call handling services require at least one server to process calls from communication devices and connect them to a dispatcher. In a call handling microservice-based architecture, incoming messages are delivered to any available instance of the service based on load-sharing (a load balancer). New instances of the service may be added as needed when the incoming message load increases and/or instances fail.

The frameworks for implementing a microservice architecture may be designed for stateless services (for example, representational state transfer or REST web applications), where each service instance is stateless and, thus, fully interchangeable. It may be advantageous to implement stateful services on such frameworks.

Stateful services may be divided into multiple phases where the service is handled as a stateless service after each phase. However, services (for example, call handling/processing), may require timers for all phases, inherently making the service stateful. Thus, during processing of a phase at a first instance, another message received at another instance may cause race conditions.

Accordingly, systems and methods described herein are directed to, among other things, implementing stateful services in a stateless microservice architecture.

One embodiment provides a state-aware microservice system for managing messages and providing a service. The state-aware service system includes a plurality of instances of the service, a message broker, a memory, and an electronic processor. The electronic processor is communicatively coupled to the memory and is configured to receive, via an available instance of the plurality of instances of the service, a message for the service and determine whether a processing of the message is consistent with the current state of the system. The electronic processor is configured to, when the processing of the message is consistent with the current state of the system, process the message via one of the plurality of instances. The electronic processor is further configured to, when the processing of the message is not consistent with the current state of the system, transmit the message to a first queue of the message broker, determine, from a timer of the message, a time-to-live of the message, and transfer the message to a second queue of one of the plurality of instances in response to the time-to-live expiring.

Another embodiment provides a method for managing messages and providing a service via a state-aware microservice system. The method includes receiving, via an available instance of a plurality of instances of the service, a message for the service and determining whether a current state of the message is consistent with the current state of the system. The method further includes, when the current state of the message is consistent with the current state of the system, processing the message via one of the plurality of instances. The method further includes, when the current state of the message is not consistent with the current state of the system, transmitting the message to a first queue of a message broker, determining, from a timer of the message, a time-to-live of the message, and transferring the message to a second queue of one of the plurality of instances in response to the time-to-live expiring.

Another embodiment provides a device configured to manage messages and provide a service. The device includes a plurality of instances of the service, a message broker, a memory, and an electronic processor communicatively coupled to the memory. The electronic processor is configured to receive, via an available instance of the plurality of instances of the service, a message for the service and determine whether a processing of the message is consistent with the current state of the system. The electronic processor is configured to, when the processing of the message is consistent with the current state of the system, process the message via one of the plurality of instances. The electronic processor is further configured to, when the processing of the message is not consistent with the current state of the system, transmit the message to a first queue of the message broker, determine, from a timer of the message, a time-to-live of the message, and transfer the message to a second queue of one of the plurality of instances in response to the time-to-live expiring.

Before embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. For example, although the examples described herein are in terms of emergency call handling systems, in other embodiments, the methods described herein may be applied to different applications (for example, customer service request handling applications).

For ease of description, some of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be understood that although the system depicts components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices connected by one or more networks or other suitable communication means.

FIG. 1 is a diagram of one embodiment of a state-aware microservice system 100. In the example shown, the microservice system 100 includes a message broker 105, an engine tier 110 including a plurality of instances 111*a-n*, and a state tier 115. At a hardware level, components of the microservice system 100 may be connected to one another via a wired network, a wireless network, or both. All or parts of the networks used in the microservice system 100 may be implemented using various communication networks, for example, a cellular network, the Internet, a Bluetooth™ network, a wireless local area network (for example, Wi-Fi), a wireless accessory Personal Area Networks (PAN), a machine-to-machine (M2M) autonomous network, and a public switched telephone network. The message broker 105, engine tier 110, state tier 115, and other components of the microservice system 100 communicate with each other using suitable wireless or wired communication protocols. In some embodiments, the microservice system 100 includes a single electronic controller or computer (for example, a server) and the message broker 105, engine tier 110, and state tier 115 may be hardware and/or software components of the system 100. In some embodiments, the engine tier 110, state tier 115, and message broker 105 may each be an independent cluster network including one or more servers/computers including one or more processors configured to perform particular functions of the microservice system 100.

The microservice system 100 is configured to receive messages from and transmit messages to one or more devices via a request network 125. In one example, the microservice system 100 is configured to provide one or more services to a target entity (for example, a client device or an application). For example, in the illustrated embodiment, the microservice system 100 is configured to provide an emergency telephone and/or land mobile radio (LMR) call handing service. In should be understood that, in some embodiments, the microservice system 100 is configured to provide a different and/or additional services (for example, text message handling, service request handling, and the like). The request network 125 may be implemented using various communication networks (for example, those described above), wired connections, and/or some combination thereof.

Figure 3:
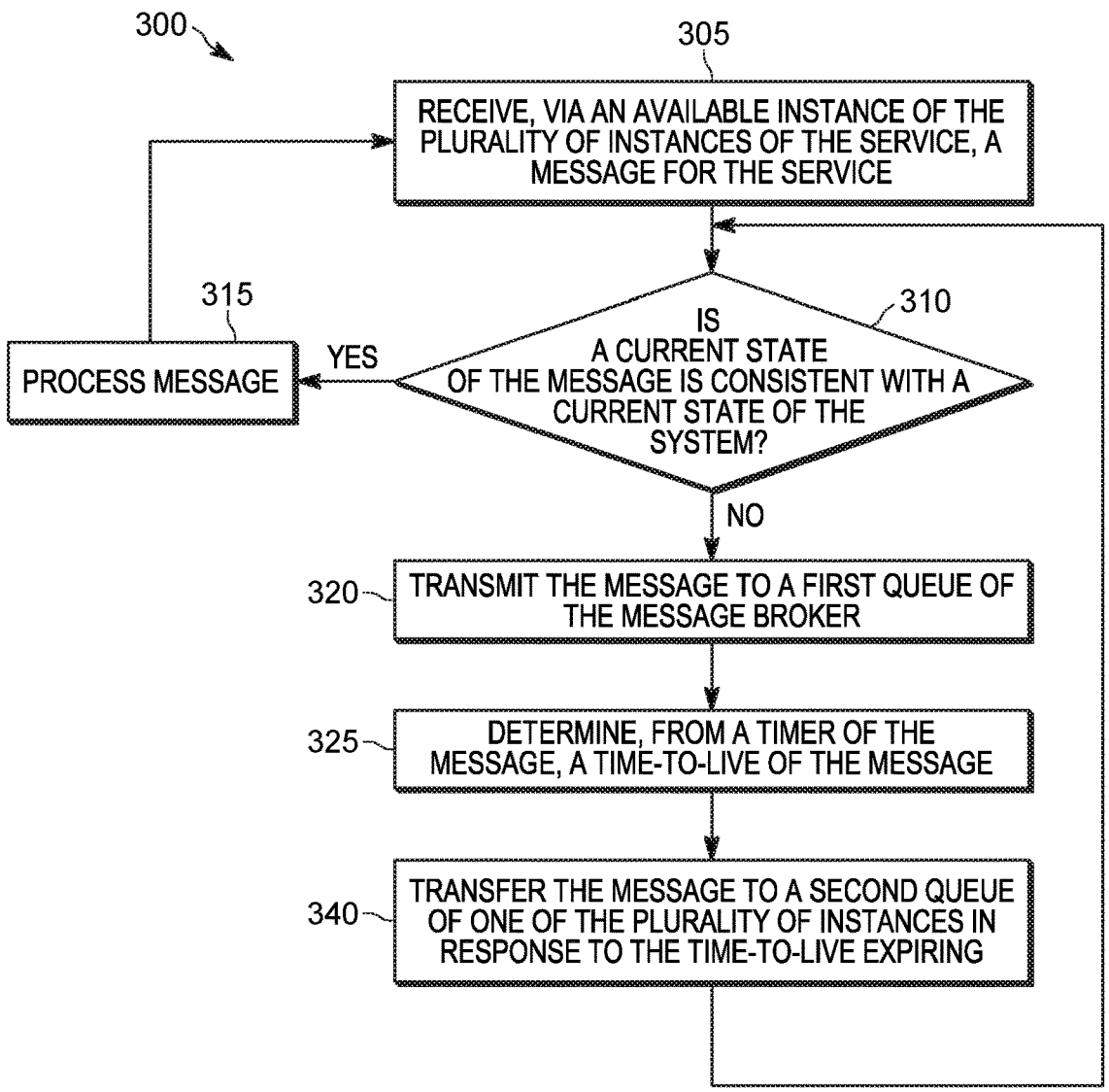
FIG. 3 is a flowchart of a method of managing messages and providing a service via the system of FIG. 1, in accordance with some embodiments.

The message broker 105 is configured to receive incoming message traffic from the request network 125 and distribute it to a particular instance of the engine tier 110 for processing or handling. For example, the message traffic is distributed to an instance available and capable of handling the message. The message broker 105 includes a first queue (reserved queue 120A) and a second queue (active queue 120B), described in more detail below in regard to the method 300 (FIG. 3). The instances 111A-111N of the engine tier 110 are each configured to process and fulfill each service request. The handling/processing of a service request is referred to herein as a "service session." The instances 111A-111N are configured to be stateless. The state tier 115 is configured to manage process state information for each of the instances 111A-111N for a particular service session (session state data corresponding to a service session being handled by the particular instance). The state tier 115 is configured to maintain in-memory data associated with various service sessions of the microservice system 100. For example, the state tier 115 is configured to store long lived (stateful) data objects while the engine tier 110 may be configured to store short lived (stateless) data objects. The state data may be maintained in partitions storing state replicas. When processing a message, the engine tier 110 may pull state data objects from the state tier 115, use the objects, and push them back to the state tier 115 after processing is complete. The state tier 115 may include a plurality of memory partitions 116, each of which correspond to a particular instance 111A-111N. State information for a particular instance may be replicated between partitions such that, in case of an instance failure, another instance may recover the state information from the replicated information.

To help ensure proper workflow/message handling of the microservice system 100, each instance 111A-111N may initiate and maintain one or more timers. Timer data may be replicated between two or more instances of the engine tier 110. The message broker 105 may also request and access timer data of the engine tier 110, for example, to timely allocate received requests. Timers may be stored on either the engine tier 110 or the state tier 115. As described in more detail below, the message broker 105 is further configured to store a time to live (TTL) corresponding to a duration of a timer. In some embodiments, the TTLs are stored in either of the engine tier 110 or the state tier 115 such that the information is available to any instance 111A-111N of the engine tier.

For ease of description, the system 100 is described in terms of a hardware system. It should be understood that, in some embodiments, some or all of the system 100 may be implemented in software as a virtual network system. In other words, the microservice system can be defined as the combination of software and hardware included in one or more electrical computing devices that run application processes of the microservice.

Figure 2:
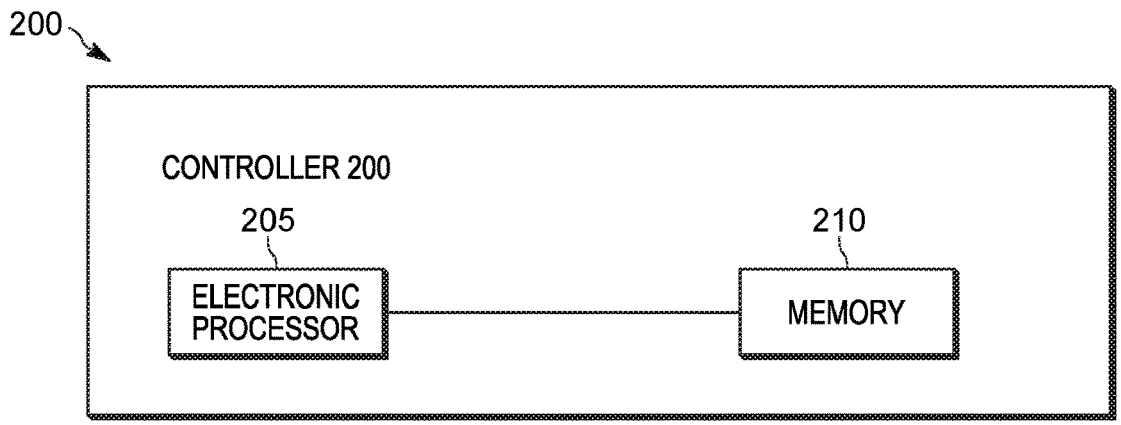
FIG. 2 is a diagram of a controller in which the microservice system of FIG. 1 may be implemented, in accordance with some embodiments.

FIG. 2 is a diagram of an electronic controller 200. The microservice system 100 may include components similar to the controller 200. In the embodiment illustrated, the controller 200 includes an electronic processor 205 (for example, a microprocessor or the like) and a memory 210. The electronic processor 205 and the memory 210, as well as other various modules (not shown) are coupled by a bus 215, or are coupled directly, by one or more additional control or data buses, or a combination thereof. In alternate embodiments, the controller 200 may include fewer or additional components in configurations different from that illustrated in FIG. 2. For example, in some embodiments, the controller 200 may include a transceiver.

The memory 210 includes read only memory (ROM), random access memory (RAM), other non-transitory computer-readable media, or a combination thereof. The electronic processor 205 is configured to retrieve instructions and data from the memory 210 and execute, among other things, instructions to perform the methods described herein.

In some embodiments, the engine tier 110, state tier 115, and/or message broker 105 include components or combinations of different components, including all or some of the various components described above with respect to the controller 200 (for example, an electronic processor, memory, and, in some embodiments, a transceiver). As a consequence, these components are not described in detail or explicitly illustrated.

FIG. 3 illustrates an example method 300 for managing messages and providing a service via a state-aware service system (for example, system 100). As an example, the method 300 is explained in terms of the controller 200, in particular the electronic processor 205. However, it should be understood that portions of the method 300 may be distributed among multiple devices/components (for example, across multiple processors of the microservice system 100).

In the example illustrated, at block 305, the processor 205 receives, via an available instance 111A-111N of a plurality of instances 111, a message for the service. The message is a request for a particular function (state) of the service provided by the microservice system 100. At block 310, the electronic processor 205 determines whether a processing of the message is consistent with the current state of the system 100. For example, the processor 205 determines whether the current state of at least one of the instances 111A-111N of the engine tier 110 is in an exclusive stateful phase (at least one of the instances 111A-111N is currently handling a message and needs to continue processing the message without any other instances starting processing a different/new message). To determine the current state, the processor 205 refers to state information of the databases 116 of the state tier 115.

When the processing of the message is consistent with the current state of the system 100 (for example, the current state is a non-exclusive stateful phase), the message may be processed by one of the instances 111A-111N immediately (block 315). Processing the message includes performing a function corresponding to the requested service indicated in the message. The processor 205, following processing of the message, may accordingly update the state information as necessary based on the performed function and, if necessary, assign a new state to the instance. The processor 205 may create a time-bound service request (a message including a request for a new service and a timer) and store the request at the message broker for future processing (returning to block 305).

When the processing of the message is not consistent with the current state of the system 100, the processor 205 transmits the message to a first queue of the message broker 105 (for example, the reserved queue 120A of FIG. 1). The reserved queue 120A is a queue from which none of the instances 111A-111N are consuming from (pulling messages from or receiving messages to be handled from). The electronic processor 205 then determines, from a timer of the message, a time-to-live of the message (block 325). The time-to-live is set to the duration of the timer.

At block 340, the electronic processor 205 transfers, in response to determining that the time-to-live of the message has expired, transfers the message to a second queue (active queue 120B of FIG. 1) of the message broker 105. The second queue is a queue from which the instances 111A-111N pull or receive messages to be handled from. This allows the system 100 (in particular, the instances 111A-111N of the engine tier) to handle the message asynchronously.

Following block 345, the electronic processor 205 returns to block 310 to determine whether the processing of the message is consistent with a second current state of the system 100. When the processing is not consistent with the second current state (in other words, the system 100 is in an exclusive stateful phase), the electronic processor 205 transmits the message to the first queue (reserved queue 120A) to repeat blocks 325-330. Alternatively, the processor 205, in some embodiments, drops and/or deletes the message. When the processing of the message is consistent with the second current state, the message is processed by an available instance of the instances 111A-111N (block 315). In some embodiments, the electronic processor 205 is configured to delete and/or drop the message in response to determining that the timer of the message has been cancelled.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A state-aware service system for managing messages and providing a service, the state-aware service system comprising:
    a plurality of instances of the service;
    a message broker;
    a memory; and
    an electronic processor communicatively coupled to the memory and configured to
        receive, via an available instance of the plurality of instances, a message for the service,
        determine whether a processing of the message is consistent with a current state of the system,
        when the processing of the message is consistent with the current state of the system, process the message via one of the plurality of instances,
        when the processing of the message is not consistent with the current state of the system, transmit the message to a first queue of the message broker,
        determine, from a timer of the message, a time-to-live of the message, and
        transfer the message to a second queue of one of the plurality of instances in response to the time-to-live expiring;
    wherein the first queue is managed such that it is not consumed by the plurality of instances and the second queue is managed such that it is consumed by at least one of the plurality of instances.

2. The system of claim 1, wherein the electronic processor is further configured to delete the message in response to detecting that the timer of the message has been cancelled.

3. The system of claim 1, wherein the electronic processor is further configured to, when the time-to-live expires, determine whether the processing of the message is consistent with a second current state of the system, when the processing of the message is not consistent with the second current state of the system, transmit the message to the first queue of the message broker or delete the message, and when the processing of the message is consistent with the second current state of the system, process the message via one of the plurality of instances.

4. A method of managing messages and providing a service via a state-aware service system, the method comprising:
    receiving, via an available instance of a plurality of instances, a message for the service,
    determining whether a processing of the message is consistent with a current state of the system,
    when the processing of the message is consistent with the current state of the system, processing the message via one of the plurality of instances,
    when the processing of the message is not consistent with the current state of the system, transmitting the message to a first queue of a message broker,
    determining, from a timer of the message, a time-to-live of the message, and
    transferring the message to a second queue of one of the plurality of instances in response to the time-to-live expiring;
    wherein the first queue is managed such that it is not consumed by the plurality of instances and the second queue is managed such that it is consumed by at least one of the plurality of instances.

5. The method of claim 4, the method further comprising deleting the message in response to detecting that the timer of the message has been cancelled.

6. The method of claim 4, the method further comprising, when the time-to-live expires, determining whether the processing of the message is consistent with a second current state of the system, when the processing of the message is not consistent with the second current state of the system, transmitting the message to the first queue of the message broker or deleting the message, and when the processing of the message is consistent with the second current state of the system, processing the message via one of the plurality of instances.

7. A device configured to manage messages and provide a service, the device comprising:
- a plurality of instances of the service;
- a message broker;
- a memory; and
- an electronic processor communicatively coupled to the memory and configured to
  - receive, via an available instance of the plurality of instances, a message for the service,
  - determine whether a processing of the message is consistent with a current state of the system,
  - when the processing of the message is consistent with the current state of the system, process the message via one of the plurality of instances,
  - when the processing of the message is not consistent with the current state of the system, transmit the message to a first queue of the message broker,
  - determine, from a timer of the message, a time-to-live of the message, and
  - transfer the message to a second queue of one of the plurality of instances in response to the time-to-live expiring;
  - wherein the first queue is managed such that it is not consumed by the plurality of instances and the second queue is managed such that it is consumed by at least one of the plurality of instances.

8. The device of claim 7, wherein the electronic processor is further configured to delete the message in response to detecting that the timer of the message has been cancelled.

9. The device of claim 7, wherein the electronic processor is further configured to, when the time-to-live expires, determine whether the processing of the message is consistent with a second current state of the system, when the processing of the message is not consistent with the second current state of the system, transmit the message to the first queue of the message broker or delete the message, and when the processing of the message is consistent with the second current state of the system, process the message via one of the plurality of instances.

* * * * *